Feb. 19, 1952 G. N. KAMM 2,586,167

OSCILLATOR

Filed July 3, 1945 2 SHEETS—SHEET 1

INVENTOR.
GEORGE N. KAMM

BY

Ralph L. Chappell

ATTORNEY

Feb. 19, 1952

G. N. KAMM 2,586,167

OSCILLATOR

Filed July 3, 1945

2 SHEETS—SHEET 2

INVENTOR
GEORGE N. KAMM

BY Ralph L. Chappell

ATTORNEY

Patented Feb. 19, 1952

2,586,167

UNITED STATES PATENT OFFICE 2,586,167

OSCILLATOR

George N. Kamm, Boston, Mass., assignor, by mesne assignments, to United States of America as represented by the Secretary of the Navy Application July 3, 1945, Serial No. 603,093

8 Claims. (Cl. 250—36)

This invention relates to stabilized oscillators and amplifiers, particularly those where the stabilization is obtained by positive and negative feedback.

It is an object of this invention to provide an improved stabilized oscillator or selective amplifier.

It is another object of this invention to provide a stabilized oscillator employing both positive and negative feedback, the amount of positive feedback being controlled by a "Thermistor" or other similar element having a negative resistance temperature coefficient, and the amount of negative feedback being controlled by a narrow band pass filter.

It is another object of this invention to provide an improved oscillator capable of producing a stable sinusoidal output voltage having very low distortion due to harmonics.

It is another object of this invention to provide an improved amplifier highly selective to a particular resonant frequency.

Other objects and features of the present invention will become apparent upon a careful consideration of the following detailed description when taken together with the accompanying drawings, where:

Figure 1:
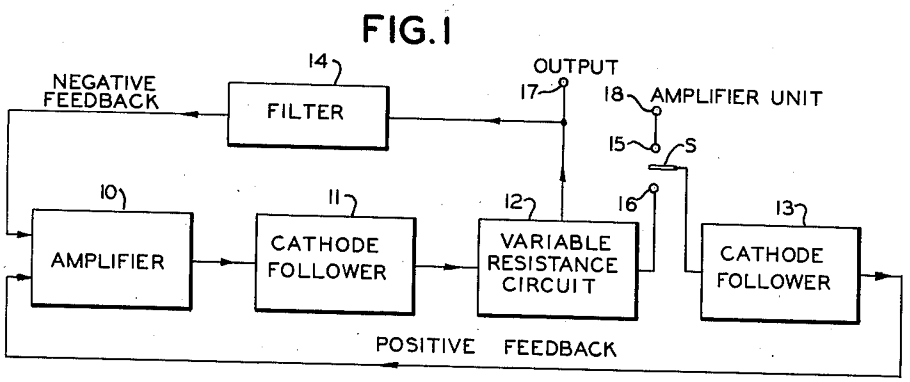
Fig. 1 illustrates a block diagram of the invention.

In Fig. 1 an amplifier 10 is shown connected to a cathode follower 11, which in turn is connected to a variable resistance circuit 12. The latter will be described in more detail later. An output terminal 17 is connected to the output of circuit 12, and the output voltage at 17 supplies negative feedback to amplifier 10 through a filter 14. An output from element 12 is also connected in circuit with a terminal 16 of the switch S. Another terminal 15 connects to a terminal 18, which is indicated as the amplifier input, and which is used when the device operates as an amplifier. The movable arm of switch S is connected to a cathode follower 13, the output of which furnishes positive feedback or the input signals to amplifier 10 depending on whether the invention is employed as an oscillator or amplifier, respectively.

With the movable arm of switch S connected to terminal 16 the invention operates as an oscillator stabilized as to output and frequency with both positive and negative feedback. With the movable arm connected to terminal 15 and with an input signal applied at 18, the invention functions as a selective amplifier, the input signal being applied to amplifier 10 through cathode follower 13.

Figure 2:
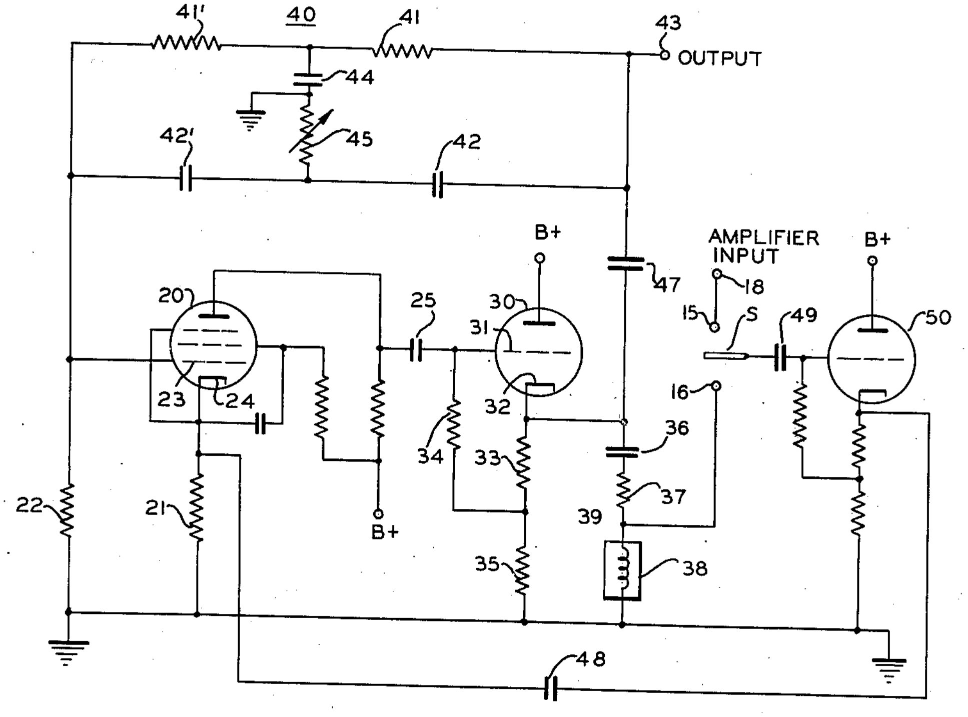
Fig. 2 illustrates a circuit diagram of the same.

A better understanding of the principles of this invention may be had by referring to Fig. 2, wherein the circuit including the thermionic tube 20, which is preferably a pentode, represents block 10 of Fig. 1. Tube 20 has the usual plate load resistor and screen grid connections. A cathode resistor 21 provides cathode bias for the tube, and a resistor 22 connects grid 23 to ground.

The output of tube 20 is coupled through a condenser 25 to the control grid of tube 30. This tube, preferably a triode, is connected as a cathode follower. The series resistors 33 and 35 furnish the electrical connection from cathode 32 to ground. Grid leak resistor 34 has its lower terminal connected to the junction of resistors 33 and 35. The purpose of this connection is to make the gain of the cathode follower more nearly linear, since resistor 35 is preferably several times larger than resistor 33. This cathode follower also provides an isolating stage or buffer between the following portion of the circuit and tube 20. Tube 30 and its associated circuit corresponds to block 11 in Fig. 1.

The output of tube 30 taken from cathode 32 is applied through a coupling condenser 36 to a resistance 37 in series with a resistance element 38. This element has a negative temperature-resistance coefficient. That is, as the current flowing through element 38 increases, its resistance decreases. This lowers the proportion of the total voltage drop which appears across element 38. Since resistances 37 and 38 are arranged as a voltage dividing circuit, the potential at point 39 changes at a rate varying with the output voltage changes at cathode 32. An increase in voltage at 32 causes a smaller proportion of this output voltage to appear at 39.

A condenser 47 couples the output of tube 30 to a narrow band pass filter 40. This filter is of the type generally referred to as a "bridged T," with condenser 44 having twice the capacity of either of the equal condensers 42 and 42′. The resonant frequency of the filter is $$f=\frac{1}{2\pi RC}$$

where R is the value of one of the equal resistances 41 and 41′, and C is the value of one of the equal condensers 42 and 42′. This filter provides a very high attenuation to any signals of the resonant frequency $f$ passing through condenser 47. At frequencies differing from resonant the attenuation of signals through the filter is low. Hence, as the frequency of the signals passing through condenser 47 deviates from the resonant frequency of the filter, they appear as negative feedback to amplifier tube 20. Variable resistance 45 provides a means for balancing the "bridged T" to obtain maximum attenuation at the resonant frequency.

Since the output of tube 20 is not reversed in polarity by cathode follower 30, the voltage applied to grid 23 of tube 20 through filter 40 causes negative feedback. If tube 20 should be operating as an oscillator, any harmonic frequencies in the output of tube 20 differing from the resonant frequency of filter 40 would cause negative feedback and be reduced in magnitude, with a resulting reduction in harmonic distortion. This gives an output voltage wave form that is almost exactly sinusoidal in shape.

The source of positive feedback necessary to cause tube 20 to act as an oscillator is obtained from point 39, the arm of switch S being connected to terminal 16. This arm is coupled through condenser 49 to a vacuum tube 50, which is connected as a cathode follower in the same manner as tube 30 and which corresponds to block 13 in Fig. 1. The output of tube 50 is coupled to cathode 24 of tube 20 through condenser 48. Since the cathode follower arrangement of tubes 30 and 50 does not reverse the polarity of the voltage output of tube 20, the application of the output voltage of tube 50 to cathode 24 of tube 20 causes a positive voltage feedback to this tube.

Consider first the action of the circuit when operating as an oscillator with the arm of switch S connected to terminal 16. An increase in the amplitude of the oscillations at the output of tube 20, and therefore, at the output of tube 30 causes an increase in the voltage across variable resistance element 38. As this voltage increases, it does so at a decreasing rate with respect to the increase of potential at cathode 32, a greater proportion of this voltage appearing across constant resistor 37. In consequence, the proportionate amount of positive feedback to tube 20 decreases with increasing amplitude of oscillations and vice versa. This condition causes stability in the amplitude of the oscillations.

Any harmonic content in the output voltage at terminal 43 is rapidly degenerated by the negative feedback through band pass filter 40. This is true, since any harmonics in the output voltage at 43 are readily passed by this filter. This reduces the effective gain of tube 20 for the harmonic frequencies, and only the desired fundamental appears in the output voltage. Furthermore, for similar reasons any tendency of the oscillator to deviate from the desired resonant frequency as set by filter 40 will be overcome. The circuit will, therefore, oscillate at substantially the resonant frequency of filter 40, and the output will be free from undesired harmonics to leave only a pure sine wave.

Consider now the action of the circuit when connected as an amplifier with the arm of switch S connected to terminal 15. The circuit now functions as a selective amplifier for an input applied to terminal 18. No positive feedback is now obtained, but the negative feedback through filter 40 prevents the amplification of signals differing from the resonant frequency of this network. Thus the amplifier is highly selective, amplifying only signals having the same frequency as the resonant frequency of filter 40.

Figure 3:
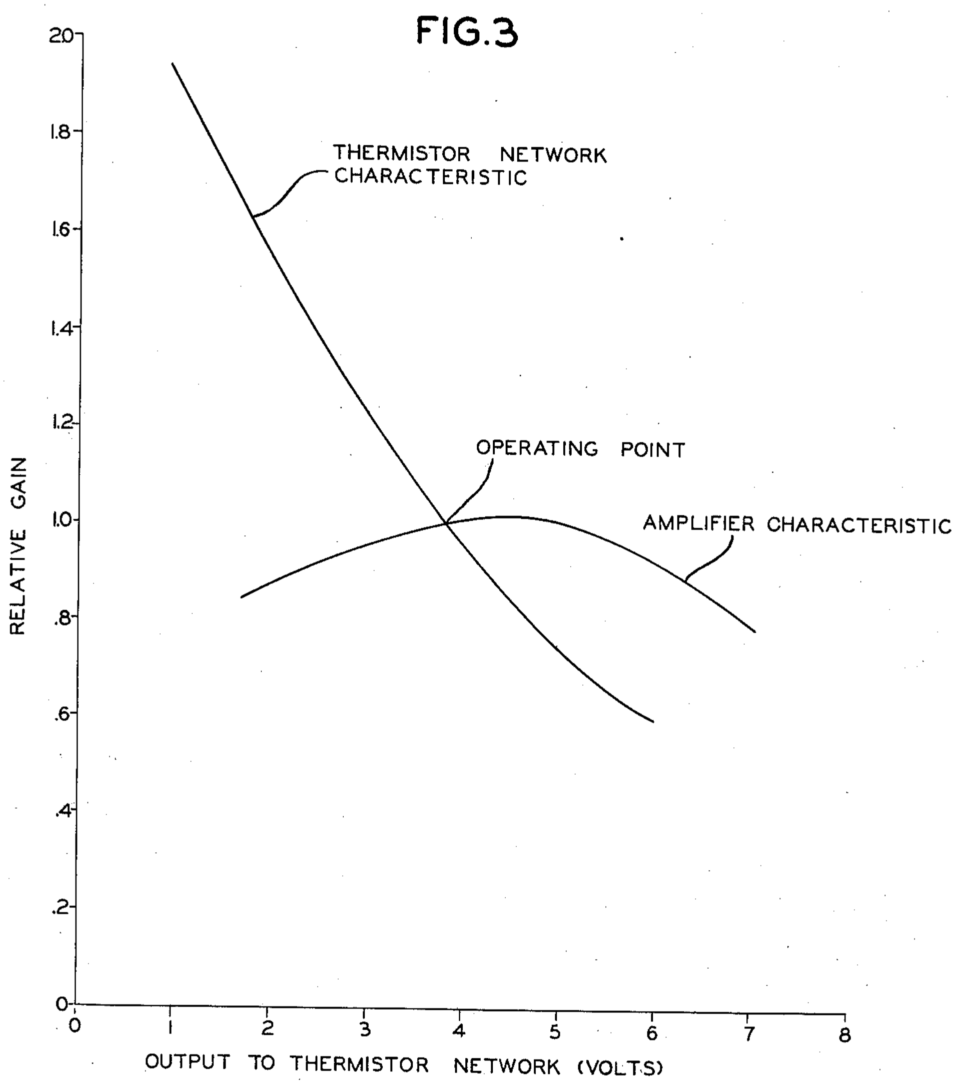
Fig. 3 illustrates a graph of certain characteristics of the invention.

In Fig. 3 is disclosed a graph taken from an actual circuit operating as an oscillator. The thermistor network characteristic shows how this network limits the amplitude. The operating point is seen to be where the relative gain is unity. The effect of varying the positive feedback is essentially to shift the curve of the thermistor network to the right or left thus controlling the amplitude of oscillation. It is due to this amplitude control and to the slow response time of the thermistor that the oscillator is capable of producing waves of low harmonic content. The amplifier is thus restricted to operating in its linear range.

Although I have shown and described only a certain specific embodiment of the invention, I am fully aware of the many modifications possible thereof. Therefore, this invention is not to be limited except insofar as is necessitated by the prior art and the spirit of the appended claims.

I claim:

1. An oscillator comprising, in combination, a first electron tube having at least a control grid, a cathode and an anode, said first tube being connected as an amplifier, a second electron tube having a control grid and a cathode, said second tube being connected as a cathode follower, the anode of said first tube being coupled to the control grid of said second tube, a negative feedback circuit coupled between the cathode of said second tube and the control grid of said first tube and including a filter adapted substantially to prevent feedback through said circuit at a predetermined frequency, but to permit feedback at frequencies substantially different from said predetermined frequency, and a positive feedback circuit coupled between the cathode of said second tube and the control grid of said first tube and including a voltage divider comprising a resistance variable with current passing therethrough and a fixed resistance relatively large with respect to said variable resistance, said resistances being so arranged as to decrease the proportion of the amplifier output fed back as the output increases and to increase the proportion of the amplifier output fed back as the output decreases.

2. The combination according to claim 1 and a second cathode follower circuit coupled in said positive feedback circuit between said voltage divider and the cathode of said first electron tube.

3. An oscillator comprising, in combination, an electron tube having at least a cathode, an anode, and a control grid, said tube being connected as an amplifier, a first cathode follower circuit coupled to the anode of said tube, a negative feedback path coupled between said cathode follower and the control grid of said tube, and a positive feedback path including a voltage divider and a second cathode follower coupled between said first cathode follower circuit and the cathode of said tube.

4. An oscillator comprising, in combination, an electron tube having at least a control grid, a cathode, and an anode, said tube being connected as an amplifier, a first cathode follower having an input and an output circuit, the anode of said tube being connected to the input circuit of said cathode follower, a negative feedback circuit coupled between the output circuit of said cathode follower and the control grid of said tube and including a filter adapted substantially to prevent feedback through said circuit at a predetermined frequency, but to permit feedback at frequencies substantially different from said predetermined frequency, a positive feedback circuit coupled between the output circuit of said cathode follower and the control grid of first tube and including a voltage divider circuit comprising a resistance variable with current passing therethrough and a fixed resistance relatively large with respect to said variable resistance, and a second cathode follower having an input and an output circuit, means coupling the junction of said fixed and variable resistances to the input circuit of said second cathode follower, and means connecting the output circuit of said second cathode follower to the cathode of said tube, said resistances being so arranged as to decrease the proportion of the amplifier output fed back as the output increases and to increase the proportion of the amplifier output fed back as the output decreases.

5. An oscillator comprising, in combination, an electron tube having at least a control grid, an anode and a cathode, said tube being connected as an amplifier, means coupled to the anode of said tube for coupling a portion of the output of said tube back to said tube without phase reversal and including a negative feedback path having a filter therein adapted substantially to prevent feedback therethrough at a predetermined frequency, but to permit feedback at frequencies substantially different from said predetermined frequency, and including also a positive feedback circuit coupled to the cathode of said tube having a nonlinear resistance arranged to decrease the proportion of the amplifier output fed back as the output increases and to increase the proportion of the amplifier output fed back as the output decreases.

6. An oscillator comprising, in combination, an amplifier having an input circuit and an output circuit, a cathode follower circuit coupled to the output circuit of said amplifier, a negative feedback path having a frequency determining filter therein coupling said cathode follower circuit to the input circuit of said amplifier, and a positive feedback circuit including a nonlinear resistance arranged to maintain the amplitude of oscillations constant coupling said cathode follower circuit to the input circuit of said amplifier.

7. An oscillator comprising, in combination, an amplifier having an input and an output circuit, a first cathode follower circuit coupled to the output circuit of said amplifier, a negative feedback path having a frequency determining filter therein coupling said cathode follower circuit to the input circuit of said amplifier, a voltage divider circuit including a resistance which decreases in value with increase in current therethrough and a fixed resistance relatively large with respect to said variable resistance, said voltage divider being connected to divide the voltage output from said first cathode follower, and a second cathode follower circuit having an input and an output circuit, means coupling the junction of said fixed and variable resistances to the input circuit of said second cathode follower circuit, and means connecting the output circuit of said second cathode follower to the input circuit of said first tube to produce regenerative feedback which automatically decreases as the output of said amplifier increases and increases as the output of said amplifier decreases.

8. An oscillator comprising, in combination, a first electron tube having at least an anode, a cathode and a control grid, said first tube being connected as an amplifier, a second electron tube having at least a cathode and a control grid, said second tube being connected as a cathode follower, means connecting the anode of said first tube and the control grid of said second tube, a negative feedback circuit connected between the cathode of said second tube and the control grid of said first tube, said negative feedback circuit comprising a bridged-T network filter adapted to prevent feedback through said circuit at a desired frequency but to permit feedback at frequencies different from said desired frequency, and a positive feedback circuit including a voltage divider for dividing the voltage appearing at the cathode of said second tube, said voltage divider comprising a resistance which decreases in value with increases in current therethrough and a fixed resistance relatively large with respect to said variable resistance, a third electron tube having at least a control grid and a cathode, said third tube being connected as a cathode follower, means connecting the junction of said fixed and variable resistances and the control grid of said third tube, and means connecting the cathode of said third tube and the cathode of said first tube, said last-defined circuit providing regenerative feedback which automatically decreases as the output of said first tube increases and increases as the output of said first tube decreases.

GEORGE N. KAMM.

REFERENCES CITED

The following references are of record in the file of this patent:

UNITED STATES PATENTS

| Number | Name | Date |
|---|---|---|
| 2,163,403 | Meacham | June 20, 1939 |
| 2,165,517 | Stevenson | July 11, 1939 |
| 2,173,427 | Scott | Sept. 19, 1939 |
| 2,258,128 | Black | Oct. 7, 1941 |
| 2,268,872 | Hewlett | Jan. 6, 1942 |
| 2,275,452 | Meacham | Mar. 10, 1942 |
| 2,319,965 | Wise | May 25, 1943 |
| 2,386,892 | Hadfield | Oct. 16, 1945 |
| 2,394,018 | Shank et al. | Feb. 5, 1946 |